United States Patent [19]

Yonezawa et al.

[11] Patent Number: 4,504,046

[45] Date of Patent: Mar. 12, 1985

[54] RETRACTING CLAMP

[76] Inventors: Keitaro Yonezawa; Tsutomu Sirakawa, both of c/o Aioi Seiki K.K., 9 Konoikekaidoshita, Itamishi, Hyogoken, Japan

[21] Appl. No.: 493,211

[22] Filed: May 10, 1983

[51] Int. Cl.[3] .............................................. B23Q 3/08

[52] U.S. Cl. ........................................ 269/24; 269/32; 269/93; 269/234

[58] Field of Search ..................... 269/24, 32, 93, 234; 91/410; 60/588

[56] References Cited

U.S. PATENT DOCUMENTS

| | | | |
|---|---|---|---|
| 3,363,514 | 1/1968 | Ramcke | 91/410 |
| 4,027,867 | 6/1977 | Pollington | 269/234 |
| 4,338,787 | 7/1982 | Kawayuchi | 60/588 |
| 4,365,792 | 12/1982 | Johns | 269/93 |

FOREIGN PATENT DOCUMENTS

| | | | |
|---|---|---|---|
| 163854 | 12/1981 | Japan | 269/234 |
| 933366 | 6/1982 | U.S.S.R. | 269/234 |

*Primary Examiner*—Robert C. Watson

*Attorney, Agent, or Firm*—Bacon & Thomas

[57] ABSTRACT

A retracting clamp for dies or workpieces, especially for the die of the injection molding machine, whose clamp arm is installed in the chamber of the clamp housing so as to shift its position between an extended position and retracted position. The clamp arm is driven with a wedge connected to the piston-rod of the hydraulic cylinder. A spring enables clamp arm to hold the clamping force in case of hydraulic oil leakage. There is also provided means for retracting the wedge without failure and means for detecting the positions of the clamp arm.

6 Claims, 9 Drawing Figures

RETRACTING CLAMP

BACKGROUND OF THE INVENTION

The present invention relates to a clamp for dies of injection molding machines, die casting machines or press machines. It and for workpieces of machine tools, especially relates to a retracting clamp, from whose clamp housing a clamp arm extends or retracts, for injection molding machines.

When exchanging dies of a horizontal type injection molding machine, the procedure is as follows. After locating a die transfer platform car along one side of the vertical die-fixing plates, the dies attached to the plates are transferred onto the platform car by a roll-type transfer device. The new dies are then transferred into the space between the die-fixing plates. Although four clamps are usually provided on each of die-fixing plates, two on the lower portion and the other two on the upper portion, according to this arrangement clamp arms of there four clamps disturb the transferring of the dies. In order to avoid this trouble, the retracting clamp is most preferable for injection molding machines.

As an example of the prior apparatus, RETRACTING CLAMP (U.S. Pat. No. 3,724,837) is shown in FIG. 9, but this retracting clamp has the following defects.

(1) The moment arm between the axial pin (124) and the axial pin (128) is equal to approximately 0.6–0.7 of the moment arm between the axial pin (124) and the clamping portion (118). Therefore, as an example, when the cylinder force F equals 1000 kgf, the clamping force f equals 600–700 kgf. So, in order to lengthen the moment arm between the axial pin (128) and the axial pin (124), the total height and configuration of the clamp is enlarged. As described hereinabove, as force magnifying ratio (i.e. the value of f/F) being extremely small, not only the hydraulic cylinder force has to be powerful, but also the total configuration enlarges and the manufacturing cost becomes very expensive.

(2) As this clamp is not provided with a mechanical latching means, when any leakage of hydraulic pressure occurs from the oil supplying piping or the oilseal packing on the piston, the clamping force also decreases. If the die falls off the die-fixing plate it causes damage to the die itself and the machine.

SUMMARY OF THE INVENTION

The first object of the present invention is to make such a retracting clamp having a large force magnifying ratio to bring about a powerful clamping force with a small hydraulic cylinder, and consequently to put a powerful and compact retracting clamp to practical use.

The second object of the present invention is to make a reliable retracting clamp with a locking means that is able to maintain a safe clamping force, even when the hydraulic pressure is lost.

The third object of the present invention is to make such a reliable retracting clamp that can operate without failure of retracting the clamp arm which often happens to conventional wedge mechanism for magnifying force.

The fourth object of the present invention is to make it possible to detect the extended position and the retracted position of the clamp arm.

The retracting clamp according to the present invention is constituted as follows.

This clamp comprises a clamp housing, a clamp arm, a wedge, a spring and a hydraulic cylinder. Within the clamp housing is formed a chamber opened in its front side. The clamp housing is provided with a fulcrum stopper facing backward at the lower portion toward the back end of the clamp housing and a reaction stopping surface facing downward at the upper portion toward the front part. The clamp arm is installed in the clamp housing so as to move forward and backward within the limit of a given range. This clamp arm is provided with a fulcrum portion facing forward at the lower portion near the back end, a clamping portion facing downward at the front bottom, a sliding slope inclined gently downward toward the back at the upper front part, and a retracting hook facing forward at the upper portion near the back end.

The clamp arm is installed in the clamp housing so that its position shiftable between an extended position, wherein the clamping portion extends out of the front end of the clamp housing, and a retracted position, wherein the clamp arm is retracted into the housing. The clamp arm is biased forward toward the extended position by a compressed coil spring located between the clamp arm and the clamp housing.

A wedge is engaged in the wedge-like space between the sliding slope and a reaction stopping surface, and is movable forward and backward. This wedge is also provided with a dragging jaw facing backward at the lower part of its back end, which is engageable with a retracting hook on the clamp arm.

An hydraulic cylinder of double acting type, is located at the back end of the clamp housing, and the front end of its piston-rod is connected to the wedge to impart motion thereto. During extension of the piston-rod, the clamp arm is shifted by the spring force to the extended position wherein the fulcrum portion contacts the fulcrum stopper. Farther pushing forward of the wedge with the piston-rod, pushes the sliding slope downward by the wedge supported with the reaction stopping portion, thus causing the clamp arm to exert a clamping force.

By retracting the wedge with the piston-rod, and thereby relieving the clamping force, the clamp arm is shifted to the retracted position by pushing backward the retracting hook with the dragging jaw.

DETAILED DESCRIPTION OF THE INVENTION

Figure 1:
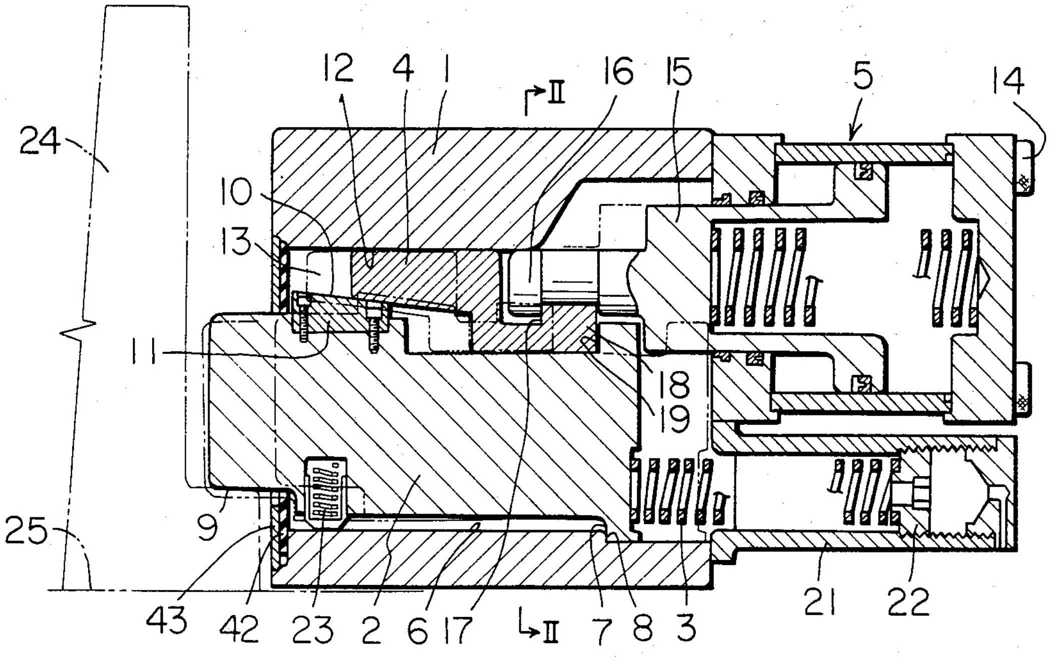
FIG. 1 is a vertical sectional side view of the retracting clamp according to the invention.
Figure 2:
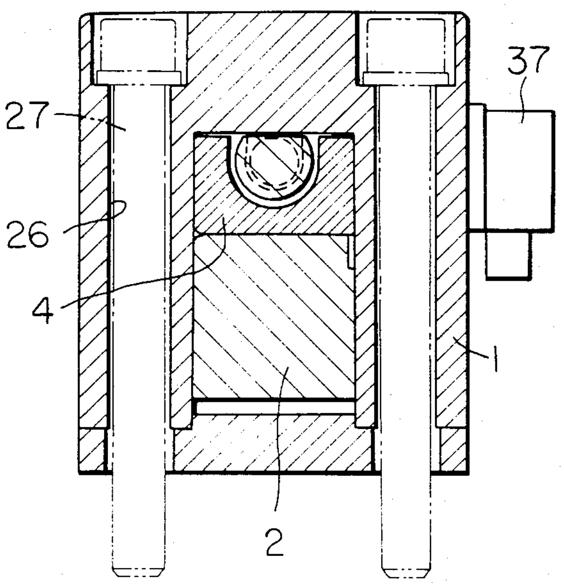
FIG. 2 is a sectional view along II—II line in FIG. 1.

FIG. 1–FIG. 8 show the most preferable embodiments of the retracting clamp according to the present invention.

The retracting clamp comprises a clamp housing(1), a clamp arm(2), a spring(3), a wedge(4) and a hydraulic cylinder(5). This arrangement drives the clamp arm(2) powerfully by means of magnifying the clamping force of the hydraulic cylinder(5) by the wedge(4). In the clamp housing(1) made of thick steel block, there is formed a chamber(6) opened at its front end, wherein the clamp arm(2) is installed so as to move forward and backward over a given range. The clamp arm(2) is biased forward by the spring(3).

The clamp arm(2) is provided with a fulcrum portion(7) facing forward at the lower rear portion. This fulcrum portion(7) can be engaged and stopped with a fulcrum stopper(8) with which the clamp housing is provided at the lower part toward the back end. Also the clamp arm is provided with a clamping portion(9) at the bottom of its front portion and a sliding wedge slop(10) inclined by 5–15 degree from the horizontal plane toward downward and backward at the top front part. This sliding wedge slope(10) may be formed on the top surface of a steel block(11) which is fixed on the clamp arm(2), but this slope(10) can also be formed on the clamp arm(2) itself without the block(11). As described above, since the sliding wedge slope(10) is inclined very gently, there can be a large magnifying ratio of the force exerted by the wedge mechanism(4). For example, when the output force of the cylinder(5) equals 1000 kgf, a force of approximately 3000 kgf can be generated at the clamping portion(9).

The clamp housing(1) is provided with a reaction stopping surface(12) along the top front part of the chamber(6), and the wedge(4) is inserted so as to slide forward and backward into the tapered wedge-like space(13) between the reaction stopping surface(12) and the sliding slope(10) of the clamp arm(2).

The hydraulic cylinder(5) of the double acting type for driving the wedge(4) is fixed laterally on the back end of the clamp housing(1) with 4 bolts(14). Its piston-rod(15) extends into the chamber(6) and is detachably connected to the wedge(4) by engaging its head with the hook of the wedge. Dragging jaw(18), formed at the lower back end part of the wedge(4), engages the retracting hook(19) facing forward at the top back end part of the clamp arm(2).

The clamp housing(1) is provided with a cylindrical casing(21) fixed with bolts(20) at its back end below the hydraulic cylinder(5). A compressed coil spring(3) is set in the casing(21) between the back end of the clamp arm(2) and a spring stopper(22), with which the clamp arm(2) is biased forward. The spring biasing force is adjustable by screwing the stopper(21). A return spring(23) pushes the front end of the clamp arm(2) upward and thus makes the clamp arm(2) contact with the wedge(4).

The retracting clamp is fixed on the die-fixing plate with 6 pairs of bolts(27) inserted into vertical holes on left and right sides of the clamp housing(1). With this retracting clamp, the die(24) or workpieces are fixed on the die-fixing plate as follows.

When extending the piston-rod(15) forward towards the left in FIG. 1), the clamp arm(2) is driven forward by the spring(3), until the clamp arm(2) is shifted to its extended position wherein the clamping portion(9) projects out of the front end of the clamp housing(1) and the fulcrum portion(7) is stopped by the fulcrum stopper(8). When the piston-rod(15) is extended further, the clamp arm remains in its position and the wedge(4) is driven into the wedge-like space(13). Thus the clamp arm(2) pivots about fulcrum portion(7) so as to move the clamping portion(9) downward. Thus the die(24) is clamped on the fixing plate(25).

When retracting the piston-rod(15), the wedge(4) relieves the clamping force by retracting the wedge(4) from the wedge-like space(13). The clamp arm(2) is pulled into the chamber(6) by the engagement of dragging jaw(18) with the retracting hook(19) to shift it to its retracted position (as shown in imaginary lines).

However, due to friction forces, the wedge(4) will retract at first together with clamp arm(2), and the wedge(4) will retract from the wedge-like space(13) after the clamp arm(2) is stopped by contact with the front end of the hydraulic cylinder(5). In order to pull back the wedge(4) from the wedge-like space(13) against static friction forces, it should be necessary to pull it back with a larger relieving force than clamping force against dynamic friction forces. Consequently, the reaction stopping surface(12), the top and bottom surfaces of the wedge(4) and the sliding slope(10) are formed to be low friction surfaces.

Figure 6:
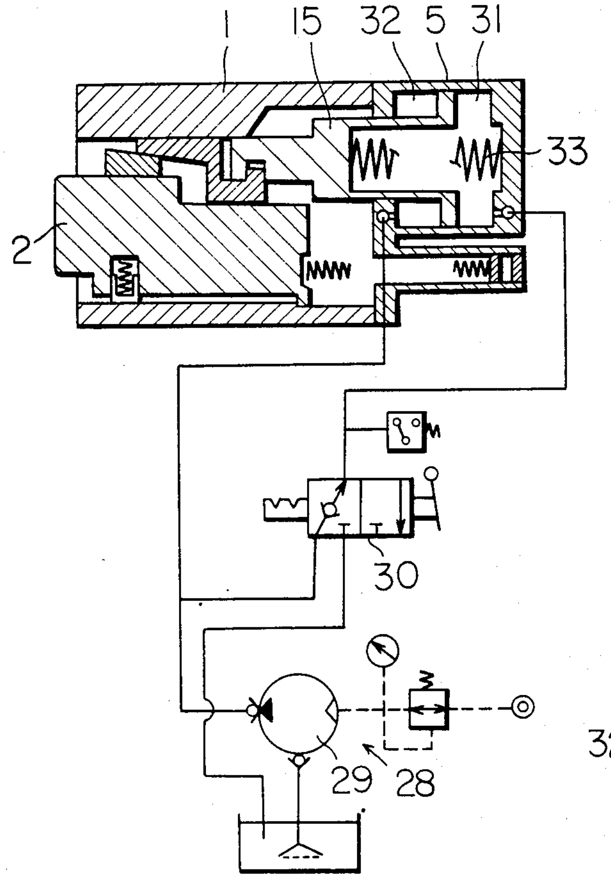
FIG. 6 is a hydraulic flow chart of the retracting clamp in FIG. 1.

As shown in FIG. 6, a pneumatically driven hydraulic pump(29) is used as hydraulic sources, having its output port communicating with the clamping oil chamber(31) via a directional control valve(30). The output port also communicates with the retracting oil chamber(32), directly, to supply the hydraulic pressure to the retracting oil chamber(32) all the time. Therefore, even when supplying hydraulic pressure to the clamping oil chamber(31), the piston-rod(15) is driven forward by the differential hydraulic force equal to that induced on the section of the piston-rod(15). When relieving clamping force by means of changing the position of valve(30), the piston-rod(15) is driven by the hydraulic force induced with the hydraulic pressure in the retracting oil chamber(32). As mentioned above, the cross sectional area of the retracting oil chamber(32) should be much larger than that of the piston-rod(15). The compression spring(33) prevents retracting of the piston-rod(15) in case of pressure drop caused by oil leakage. If there is no strong vibration transmitted to the clamp arm(2) from the die(24) or the workpieces, the spring(33) may be omitted. When the inclined angle of the sliding slope(10) is approximately 5–15 degrees, the wedge(4) is locked mechanically by friction forces induced on the wedge(4) without any force from the piston-rod(15), and therefore retain the clamp arm(2) in its clamping condition.

Figure 7:
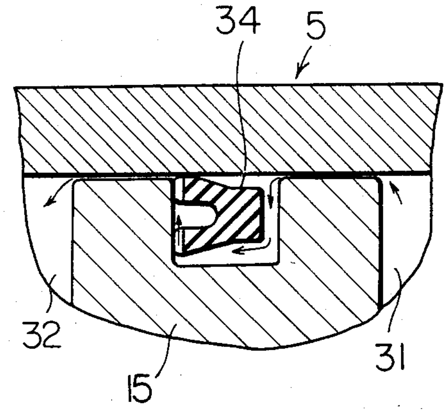
FIG. 7 is a partial vertical sectional view of a modified hydraulic cylinder.

However, equivalent function to above hydraulic system can be brought about by the following means. As shown in FIG. 7, the packing(34) of the piston(15) is provided with a small groove for controlled leakage of hydraulic oil from the clamping oil chamber(31) to the retracting oil chamber(32). The packing(34) is constructed so as to prevent leakage in the opposite direction.

Figure 8:
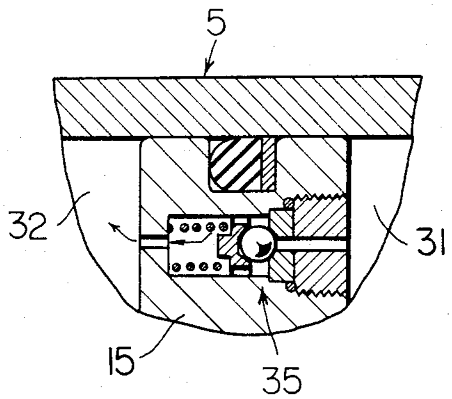
FIG. 8 is a partial vertical sectional view of another modified hydraulic cylinder.
Figure 9:
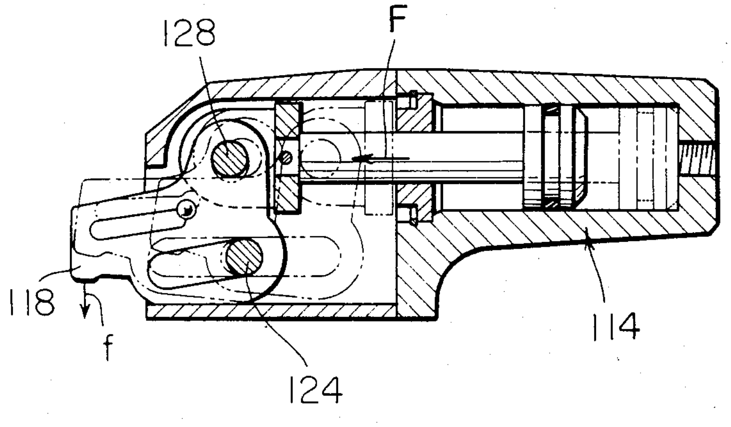
PRIOR ART FIG. 9
FIG. 9 is a vertical sectional side view of the prior art retracting clamp.

As shown in FIG. 8, the piston(15) is provided with a ball check valve(35) through which the hydraulic oil may flow into the retracting oil chamber(32) from the clamping oil chamber(31).

Figure 4:
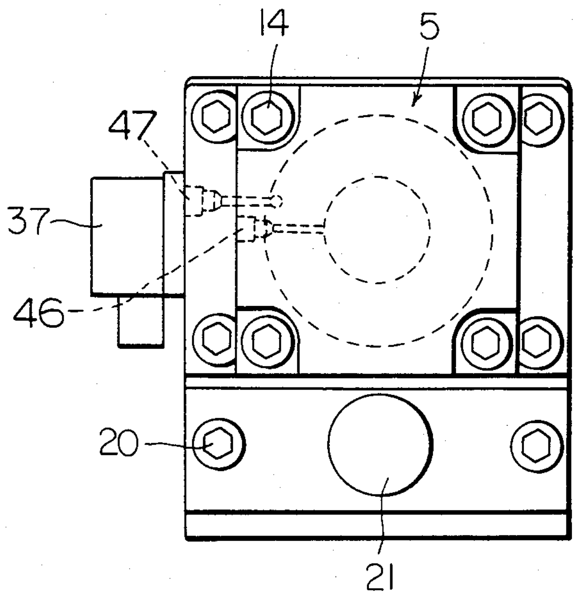
FIG. 4 is a rear view of the retracting clamp in FIG. 1.
Figure 5:
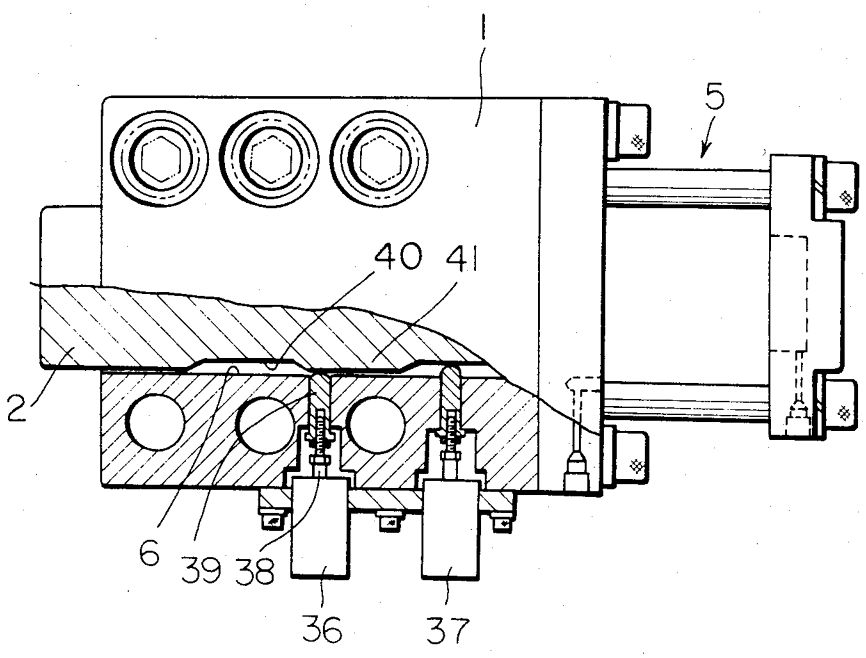
FIG. 5 is a partial, sectional horizontal plan view.

In FIG. 4, reference numeral(46) is a hydraulic supply port for the clamping oil chamber(31), and reference numeral(47) is a hydraulic supply port for the retracting oil chamber(32).

Hereinafter, a detecting device for the clamp arm(2) is adapted as follows. The clamp housing(1) is provided with a pair of limit switches(36,37) on its side wall, whose detecting tips(38) contact with detecting rods(39) respectively. Each of the detecting rods(39) extends into a horizontal groove(40) formed on the side wall of the clamp arm(2). When the clamp arm(2) is in its extended position, the front limit switch(36) is operated by a detecting convex(41) formed along the groove(40), and when the clamp arm(2) is in its retracted position, the other limit switch(37) is operated by the convex(41). With above detection signals, the hydraulic cylinder(5) can be operated properly by remote cotrol system. But, the location of the limit switches(36,37) is not limited to that shown in FIG. 4, and the limit switches(36,37) can be operated with other constitutions.

Figure 3:
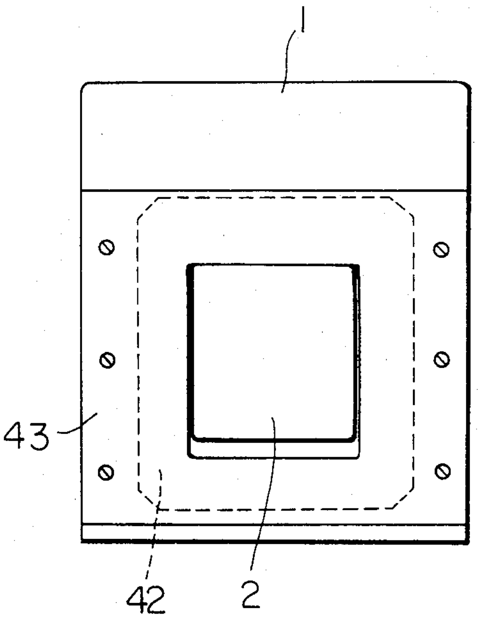
FIG. 3 is a front view of the retracting clamp in FIG. 1.

In FIG. 1 and FIG. 3, reference numeral(42) is a dust seal made of rubber or plastic material, which is fixed to the clamp housing(1) with a cover plate(43). The clamp housing(1) is not necessarily fixed to the fixing plate(25) by bolts(27), but the clamp housing(1) can be attached to the fixing plate(25) by inserting a T-sectioned leg extending from its bottom into a T-groove formed on the plate(25).

What we claim is:

1. A retracting claim comprising:

a. a clamp housing having front and back ends defining a chamber therein, the chamber opening through the front end of the housing;

b. A fulcrum stopper defined by the housing within the chamber near the back end of the housing;

c. a clamp arm slidably disposed in the chamber so as to be movable between a retracted position and an extended position wherein it exerts a clamping force on a workpiece, the clamp arm having a fulcrum portion adjacent a first end which engages the fulcrum stopper at the limit of the arms extended position;

d. sloping wedge surface formed on a second end of the clamp arm, the surface sloping downwardly in a direction toward the back end of the housing;

e. retracting hook means formed on the clamp arm adjacent the first end thereof;

f. a wedge element disposed in the chamber between the sloping wedge surface and the housing so as to be slidable with respect to the housing and the clamp arm, the wedge element having a jaw portion to engage the retracting hook means;

g. compression spring means interposed between the clamp arm and the housing to bias the clamp arm toward its extended position; and h. hydraulic cylinder means attached to the housing having a piston rod extending into the chamber and attached to the wedge element such that extension of the piston rod from the cylinder means causes the clamp arm to move from its retracted position to its extended position until the fulcrum portion contacts the fulcrum stopper and further extension of the piston rod moves the wedge element with respect to the sloping wedge surface thereby causing the clamp arm to pivot about the fulcrum portion, and retraction of the piston rod into the cylinder means causes the clamp arm to move from its extended position to its retracted position by engagement of the jaw portion of the wedge element with the retracting hook means on the clamp arm.

2. The retracting clamp of claim 1 further comprising second compression spring means in the hydraulic cylinder means to bias the piston rod toward its extended position.

3. The retracting clamp of claim 2 wherein the hydraulic cylinder means comprises:

a. a piston attached to the piston rod and slidably retained in a hydraulic cylinder, the piston dividing the hydraulic cylinder into a clamping oil chamber on one side of the piston and a retracting oil chamber on the opposite side of the piston;

b. a source of pressurized hydraulic fluid having an output;

c. first conduit means connecting the output to the retracting oil chamber;

d. second conduit means connecting the output to the clamping oil chamber; and, e. valve means in the second conduit means to selectively shut off the flow of hydraulic fluid through the second conduit.

4. The retracting clamp of claim 3 further comprising: seal means disposed around the piston having means to allow hydraulic fluid to flow from the clamping oil chamber to the retracting oil chamber, but prevent hydraulic fluid flow in the reverse direction.

5. The retracting clamp of claim 3 further comprising check valve means extending through the piston to allow hydraulic fluid to flow from the clamping oil chamber to the retracting chamber, but prevent flow in the reverse direction.

6. The retracting clamp of claim 3 further comprising:

a. first and second limit switches attached to the housing, each having detecting rods extending into the chamber; and, b. actuating means on the clamp arm contacting the detecting rods such that a first limit switch is closed when the clamp arm is in its extended position and the second limit switch is closed when the clamp arm is in its retracted position.

* * * * *